March 1, 1955 A. B. NEARING 2,703,244
COUPLING DEVICE FOR IMPLEMENTS OR VEHICLES
Filed Aug. 9, 1952
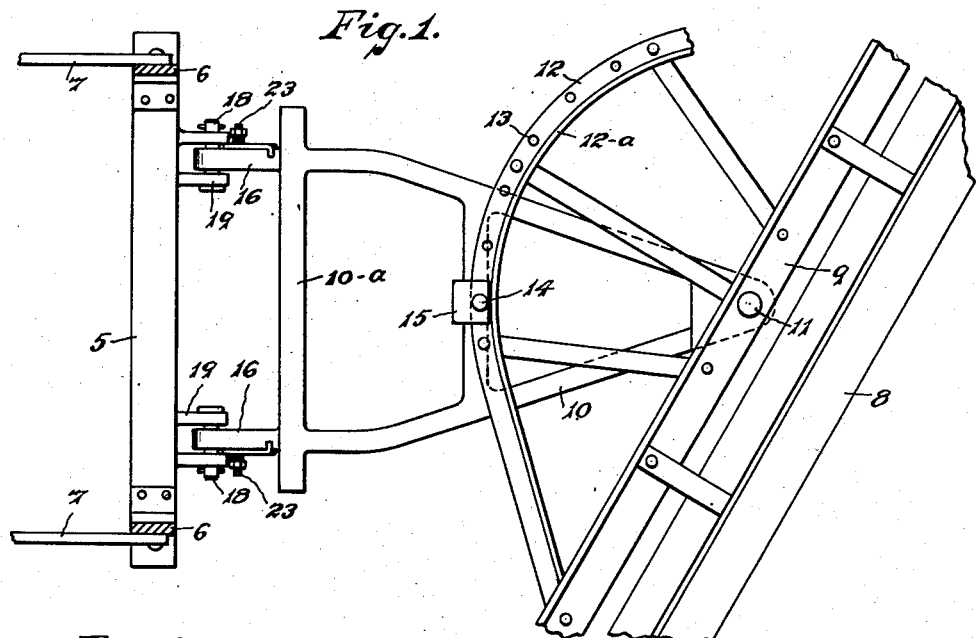
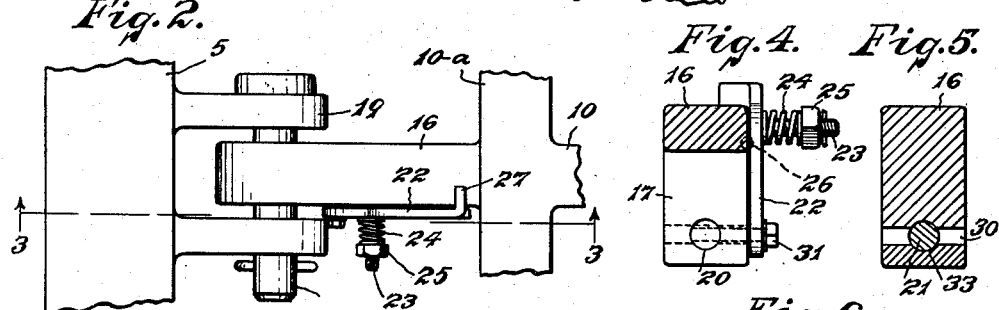
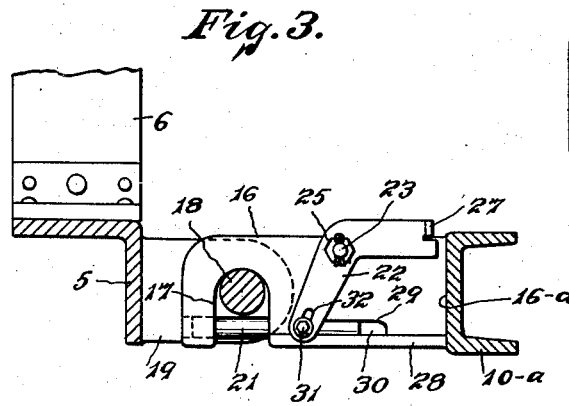
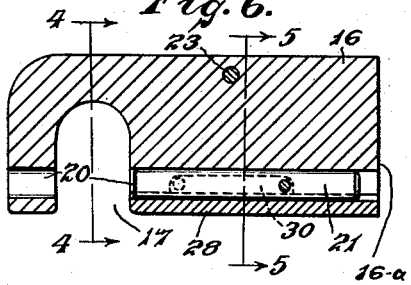
INVENTOR.
ALLAN B. NEARING.
BY
Louis V. Lucia
ATTORNEY.

United States Patent Office 2,703,244
Patented Mar. 1, 1955

2,703,244

COUPLING DEVICE FOR IMPLEMENTS OR VEHICLES

Allan B. Nearing, West Hartford, Conn.

Application August 9, 1952, Serial No. 303,462

1 Claim. (Cl. 280—504)

This invention relates to a coupling device and more particularly to such devices as are intended for securing a snowplow to a vehicle such as a tractor or truck.

The primary object of this invention is to provide such a coupling device having novel improvemets over the coupling device described in U. S. Patent No. 2,577,145, dated December 4, 1951, to simplify the attachment of said device to the snowplow, and to render the device more adaptable to snowplows of different designs.

A further object of this invention is to provide such a coupling device which will be simpler in construction and more economical to manufacture than the device described in the said patent.

Further objects and advantages of the present invention will be more clearly understood from the following description and from the accompanying drawings in which:

Fig. 1 is a plan view of a coupling device embodying my present invention and showing a portion of a snowplow and a portion of a vehicle frame to which the plow is attached.

Fig. 2 is an enlarged plan view of a portion of the mechanism illustrated in Fig. 1.

Fig. 3 is a sectional side view thereof on line 3—3 of Fig. 2.

Fig. 4 is a sectional rear view of the coupling device on line 4—4 of Fig. 6.

Fig. 5 is a sectional end view on line 5—5 of Fig. 6 with the bolt removed therefrom.

Fig. 6 is a side view of the said coupling device in central vertical section.

As shown in the drawings, the numeral 5 denotes a supporting bar which may be secured to the frame of a vehicle, such as a tractor or truck. In the form shown, the said bar may be hung from the front portion of the vehicle by means of hanger bars 6—6 and braced on said frame by bracing bars 7—7.

The snowplow shown is of a conventional construction and includes a blade 8 which is preferably connected to a supporting bar 9 that is swivelly secured to a supporting frame 10 by means of a swivel pin 11.

A securing frame 12 is fastened to the opposite ends of the said bar 9 and curved, as at 12—a, on a radius having its center at the swivel pin 11. The said frame 12 is provided with a series of holes 13 to receive a positioning pin 14 which extends through a fastening plate 15 that is mounted on the frame 10 and thereby secures the plow at different angles with relation to the axis of the vehicle frame.

It has been found that the construction of the said supporting frames differs between those of different manufacturers so that it is difficult on some of the frames to install the coupling device described in the above mentioned patent.

My present invention, therefore, provides a pair of coupling members 16—16 each having a flat free end portion 16—a by means of which it is particularly adapted to be attached to the flat side of a member such as the transverse tie bar 10—a at the rear end of the supporting frame 10. Each coupling member is constructed to provide a notch 17 therein which is adapted to receive a stud or bolt 18 that extends transversely through a supporting bracket 19 that is fastened to the front of the bar 5.

The said coupling member has a longitudinal hole 20 in which is slidably mounted a locking bolt 21 that is adapted to be extended across the notch 17, as clearly shown in Fig. 3. This locking bolt is connected to an operating lever 22 which is pivoted upon the coupling member 16 by means of a threaded stud 23 upon which there is mounted a spring 24 that is adjustable by a nut 25 that is threaded to the said stud for forcing the lever in the direction of the said member 16. A suitable ball 26 is contained within a recess in the said coupling member and engages with spaced recesses in the lever under the force of said spring for operatively securing the lever to retain the locking bolts 21 in either the locking position shown in Fig. 3 or the open unlocked position shown in Fig. 6.

The said operating lever 22 has a stop finger 27 which is bent perpendicularly thereto and overlies the top of the coupling member 16 so as to provide a stop for the lever when the bolt is in locked position.

As shown in Figs. 3 and 6, the coupling member is preferably constructed with a separate bar portion 28 which is welded over a notch 29 to provide the slot 30 through which extends a stud 31 that projects through a slot 32 in the lever and secures the said lever to the bolt 21. After the bar 28 is welded to the edge of the coupling member, the hole 20 is drilled therethrough to receive the said locking bolt and this provides for economy in the production of the coupling units since it eliminates the necessity of cutting the slot 30 by more costly conventional methods.

It will be understood from the above description that the coupling member 16—16 may be secured to the bar 10—a by being welded thereto with their flat end portion against the side of the said bar and that the particular construction of the said members renders them adaptable to be easily attached to supporting frames of different designs to which it has been found difficult to attach the coupling device described in my above mentioned patent.

Although I have illustrated the use of my improved connection in a snowplow, it is to be understood that the same may be used for coupling various other devices and that the said invention is particularly related to a support for such devices, such as the frame 10 above described.

I claim:

In a coupling device, a coupling member comprising an elongated structure having a transverse notch forming a hook portion adjacent to one end of said member, a separate notch extending longitudinally in one edge of said member, a bar secured upon said edge and over the said separate notch to provide an elongated slot in said member, said member having a hole running longitudinally therethrough and partly extending into said bar, a locking bolt slidably mounted in said hole and adapted to be extended across the transverse notch, an operating lever pivotally mounted upon the side of the said coupling member and having an extension thereon with an elongated opening therein, a stud extending through the said opening and secured to the locking bolt, means between the lever and coupling member for retaining the locking bolt in locking position across said transverse slot, a rearward projection on said lever, and stop means on said rearward projection engageable with the top of the coupling member for limiting the pivotal movement of the lever in one direction.

References Cited in the file of this patent

UNITED STATES PATENTS

| | | |
|---|---|---|
| 969,595 | Blossfeld | Sept. 6, 1910 |
| 2,577,145 | Nearing et al. | Dec. 4, 1951 |